US008271707B2

(12) United States Patent
Fan et al.

(10) Patent No.: US 8,271,707 B2
(45) Date of Patent: Sep. 18, 2012

(54) METHOD AND SYSTEM FOR PCI HYBRID FUNCTION

(75) Inventors: Frankie Fan, Diamond Bar, CA (US); Robert Lusinsky, Anaheim Hills, CA (US); Burhan Masood, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 284 days.

(21) Appl. No.: 12/706,964

(22) Filed: Feb. 17, 2010

(65) Prior Publication Data

US 2011/0202702 A1 Aug. 18, 2011

(51) Int. Cl.
*G06F 13/00* (2006.01)
*G06F 9/00* (2006.01)

(52) U.S. Cl. .......... 710/104; 713/1

(58) Field of Classification Search .......... 710/313
See application file for complete search history.

(56) References Cited

U.S. PATENT DOCUMENTS 7,743,189 B2 * 6/2010 Brown et al. .......... 710/104
7,913,024 B2 * 3/2011 Brown et al. .......... 710/313
7,934,033 B2 * 4/2011 Malwankar et al. .......... 710/104
7,979,592 B1 * 7/2011 Pettey et al. .......... 710/3
8,103,810 B2 * 1/2012 Brown et al. .......... 710/62
2008/0040526 A1 * 2/2008 Suzuki et al. .......... 710/302
2009/0248947 A1 * 10/2009 Malwankar et al. .......... 710/316
2009/0276551 A1 * 11/2009 Brown et al. .......... 710/72
2009/0276775 A1 * 11/2009 Brown et al. .......... 718/100
2009/0313391 A1 * 12/2009 Watanabe .......... 710/8
2010/0165874 A1 * 7/2010 Brown et al. .......... 370/254
2011/0016235 A1 * 1/2011 Brinkmann et al. .......... 710/8
2011/0055433 A1 * 3/2011 Kishore et al. .......... 710/9
2011/0119423 A1 * 5/2011 Kishore et al. .......... 710/302

FOREIGN PATENT DOCUMENTS

WO WO 2009120187 A2 * 10/2009

* cited by examiner

*Primary Examiner* — Ryan Stiglic
(74) *Attorney, Agent, or Firm* — Thomas, Kayden, Horstemeyer & Risley, LLP.

(57) ABSTRACT

A single root I/O virtualization (SR-IOV) capable peripheral component interconnect (PCI) device may be operable to configure resources to transparently operate in a non-SR-IOV environment utilizing a physical function (PF) and one or more hybrid functions (HFs). In instances when the SR-IOV capable PCI device is operating in a SR-IOV environment, the SR-IOV capable PCI device may expose a VF configuration space in the hybrid function to an associated PCI driver for configuring the hybrid function as a virtual function. In instances when the SR-IOV capable PCI device is operating in a non-SR-IOV environment, the SR-IOV capable PCI device may hide a SR-IOV extended header in the physical function from the associated PCI driver and expose a PF configuration space in the hybrid function to the associated PCI driver for configuring the hybrid function as a physical function.

21 Claims, 6 Drawing Sheets

METHOD AND SYSTEM FOR PCI HYBRID FUNCTION

CROSS-REFERENCE TO RELATED APPLICATIONS/INCORPORATION BY REFERENCE

[Not applicable]

FIELD OF THE INVENTION

Certain embodiments of the invention relate to communication. More specifically, certain embodiments of the invention relate to a method and system for PCI hybrid function.

BACKGROUND OF THE INVENTION

Virtualization is a way to run multiple environments on a computer system. Virtualization is a division and sharing of physical resources such as, for example, processor, memory, Input/output (I/O) and/or storage resources, where each such set of resources operates independently with its own system image (SI) or operating system (OS) instance and applications. There has been significant effort in the computing industry to address the performance, efficiency and robustness of virtualized platforms.

The peripheral component interconnect (PCI) special interest group (SIG) has developed a single root I/O virtualization (SR-IOV) specification to address sharing of I/O devices in a standard way. The SR-IOV brings out a standard way of sharing an I/O device or PCI device for multiple users while maintaining isolation between users or virtual machines. The PCI device may comprise, for example, a conventional PCI device, a PIC-X device and/or a PCI express (PCI-E) endpoint device. The SR-IOV provides a standard mechanism for a single PCI device to appear as multiple PCI functions. The SR-IOV introduces the concept of physical functions (PFs) and virtual functions (VFs). Physical functions (PFs) are full-featured PCI functions that include a SR-IOV extended capability which is used to configure and manage the SR-IOV functionality. Virtual functions (VFs) are lightweight PCI functions that contain the resources necessary for data movement but have a carefully minimized set of configuration resources. Normally, the SR-IOV may require support in the eco-system such as the basic input/output system (BIOS), the operating system (OS) and/or the hypervisor that are running on the hardware.

A SR-IOV capable PCI device may be able to present multiple instances of itself up to the OS instance or hypervisor. The SR-IOV capable PCI device may be configured to appear in the PCI configuration space as multiple functions, each with its own configuration space completed with optional base address registers (BARs). One or more independent VFs may be assigned to a virtual machine by mapping the actual configuration spaces of the VFs to the configuration spaces presented to the virtual machine.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

A system and/or method for PCI hybrid function, substantially as shown in and/or described in connection with at least one of the figures, as set forth more completely in the claims.

Various advantages, aspects and novel features of the present invention, as well as details of an illustrated embodiment thereof, will be more fully understood from the following description and drawings.

DETAILED DESCRIPTION OF THE INVENTION

Figure 1:
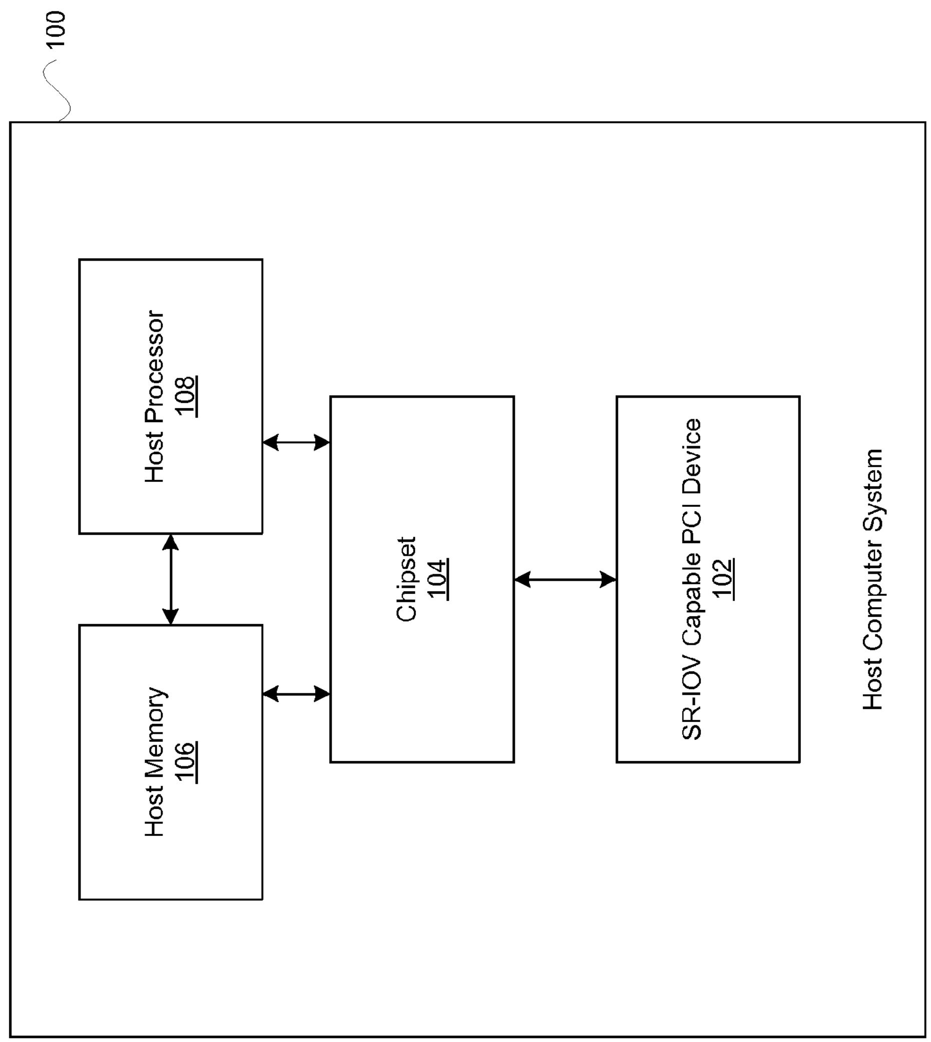
FIG. 1 is a block diagram illustrating an exemplary host computer system that is operable to provide PCI hybrid function, in accordance with an embodiment of the invention.

Certain embodiments of the invention can be found in a method and system for PCI hybrid function. In various embodiments of the invention, a single root I/O virtualization (SR-IOV) capable peripheral component interconnect (PCI) device may be operable to configure resources of the SR-IOV capable PCI device to transparently operate in a non-SR-IOV environment utilizing a physical function (PF) and one or more hybrid functions (HFs). In this regard, the physical function (PF) and the hybrid functions (HFs) are also utilized to configure the resources of the SR-IOV capable PCI device to operate in a SR-IOV environment. The physical function may comprise a PF configuration space and a SR-IOV extended header, and the hybrid function may comprise a virtual function (VF) configuration space and a PF configuration space. In instances when the SR-IOV capable PCI device is operating in a SR-IOV environment, the SR-IOV capable PCI device may configure the resources to operate in the SR-IOV environment by configuring the PF configuration space and the SR-IOV extended header in the physical function and the VF configuration space and the PF configuration space in the hybrid function. In this regard, the PF configuration space in the physical function may be exposed to an associated PCI driver to provide a full-featured PCI function. The SR-IOV extended header in the physical function may be exposed to the associated PCI driver for managing the SR-IOV functionality. The VF configuration space in each of the hybrid functions may be exposed to the associated PCI driver. The PF configuration space in each of the hybrid functions may be hidden from the associated PCI driver.

In instances when the SR-IOV capable PCI device is operating in a non-SR-IOV environment, the SR-IOV capable PCI device may also configure the resources to operate in the non-SR-IOV environment by configuring the PF configuration space and the SR-IOV extended header in the physical function and the VF configuration space and the PF configuration space in the hybrid function. In this regard, for example, the PF configuration space in the physical function may be exposed to an associated PCI driver. The SR-IOV extended header in the physical function may be hidden from the associated PCI driver. The PF configuration space in each of the hybrid functions may be exposed to the associated PCI driver. The VF configuration space in each of the hybrid functions may be hidden from the associated PCI driver. In this instance, the physical function may control the resources for arbitration and/or supervision functions that are common to the hybrid functions.

While operating in the non-SR-IOV environment, the SR-IOV capable PCI device may also be operable to, for example, hide both the PF configuration space and the SR-IOV extended header in the physical function from the associated PCI driver. The PF configuration space in each of the hybrid functions may be exposed to the associated PCI driver. The VF configuration space in each of the hybrid functions may be hidden from the associated PCI driver. In this instance, each of the hybrid functions with PF configuration space exposed may operate independently without affecting operations of the others. Each of the hybrid functions may be managed and supervised individually, when requested, via an internal routing to the hidden physical function, for example.

The SR-IOV capable PCI device may comprise, for example, a SR-IOV capable conventional PCI device, a SR-IOV capable PCI-X device, and/or a SR-IOV capable PCI express (PCI-E) endpoint device.

FIG. 1 is a block diagram illustrating an exemplary host computer system that is operable to provide PCI hybrid function, in accordance with an embodiment of the invention. Referring to FIG. 1, there is shown a host computer system 100. The host computer system 100 may comprise a SR-IOV capable PCI device 102, a chipset 104, a host memory 106 and a host processor 108.

The SR-IOV capable PCI device 102 may comprise suitable logic, circuitry, interfaces and/or code that may be operable to interface and/or communicate with other components in the host computer system 100 via a PCI bus. The PCI bus may be, for example, a conventional PIC bus, a PCI-X bus or a PCI-E bus. The SR-IOV capable PCI device 102 may comprise, for example, a SR-IOV capable conventional PCI device, a SR-IOV capable PCI-X device and/or a SR-IOV capable PCI-E endpoint device. The SR-IOV capable PCI device 102 may be, for example, a network interface controller (NIC), a sound card, an USB port, a serial port, a TV tuner or a disk controller. The SR-IOV capable PCI device 102 may comprise a PCI configuration space to allow auto configuration of the device in cases of, for example, plug-and-play.

In an exemplary embodiment of the invention, the SR-IOV capable PCI device 102 may be configured to operate in either a SR-IOV environment or a non-SR-IOV environment. In the SR-IOV environment, an operating system (OS), a hypervisor and/or an eco-system which support the SR-IOV configuration are deployed in the host computer system 100. In the non-SR-IOV environment, the operating system, the hypervisor and/or the eco-system that are deployed in the host computer system 100 may not support the SR-IOV configuration. The SR-IOV capable PCI device 102 may be operable to manage and/or configure resources based on the SR-IOV standard with a physical function (PF) and one or more hybrid functions (HFs). Based on a configuration of the hybrid function and a configuration of the physical function, the SR-IOV capable PCI device 102 may be enabled to operate in either the SR-IOV environment or the non-SR-IOV environment. The physical function may comprise a PF configuration space and a SR-IOV extended header which may be used for managing the SR-IOV functionality. The hybrid function may comprise a virtual function (VF) configuration space and a PF configuration space. In instances when the SR-IOV capable PCI device 102 is operating in a SR-IOV environment, the SR-IOV capable PCI device 102 may expose the VF configuration space in the hybrid function to an associated PCI driver for configuring the hybrid function as a virtual function. In instances when the SR-IOV capable PCI device 102 is operating in a non-SR-IOV environment, the SR-IOV capable PCI device 102 may expose the PF configuration space in the hybrid function to the associated PCI driver for configuring the hybrid function as a physical function while the SR-IOV extended header is hidden from the associated PCI driver.

The chipset 104 may comprise suitable logic, circuitry, interfaces and/or code that may be operable to route data between PCI buses in the host computer system 100 so that all the components including, for example, the SR-IOV capable PCI device 102 may communicate with each other. The chipset 104 may comprise a northbridge and a southbridge. The northbridge is operable to control transfers between the host processor 108 and the host memory 106. The southbridge handles communications between peripheral devices such as, for example, the SR-IOV capable device 102.

The host memory 106 may comprise suitable logic, circuitry, interfaces and/or code that may be operable to store information such as executable instructions and data that may be utilized by the host processor 108. The host memory 106 may comprise RAM, ROM, low latency nonvolatile memory such as flash memory and/or other suitable electronic data storage.

The host processor 108 may comprise suitable logic, circuitry, interfaces and/or code that may be operable to process data. In an exemplary embodiment of the invention, the host processor 108 may operate in the SR-IOV environment. In another embodiment of the invention, the host processor 108 may operate in the non-SR-IOV environment.

In operation, the SR-IOV PCI device 102 may be operable to manage and/or configure resources based on the SR-IOV standard with a physical function (PF) and one or more hybrid functions (HFs). Based on a configuration of the hybrid function and a configuration of the physical function, the SR-IOV capable PCI device 102 may be enabled to operate in either the SR-IOV environment or the non-SR-IOV environment. In instances when the SR-IOV capable PCI device 102 is operating in a SR-IOV environment, the SR-IOV capable PCI device 102 may expose the VF configuration space in the hybrid function to the associated PCI driver for configuring the hybrid function as a virtual function. In instances when the SR-IOV capable PCI device 102 is operating in a non-SR-IOV environment, the SR-IOV capable PCI device 102 may expose the PF configuration space in the hybrid function to the associated PCI driver for configuring the hybrid function as a physical function while the SR-IOV extended header is hidden from the associated PCI driver.

Figure 2A:
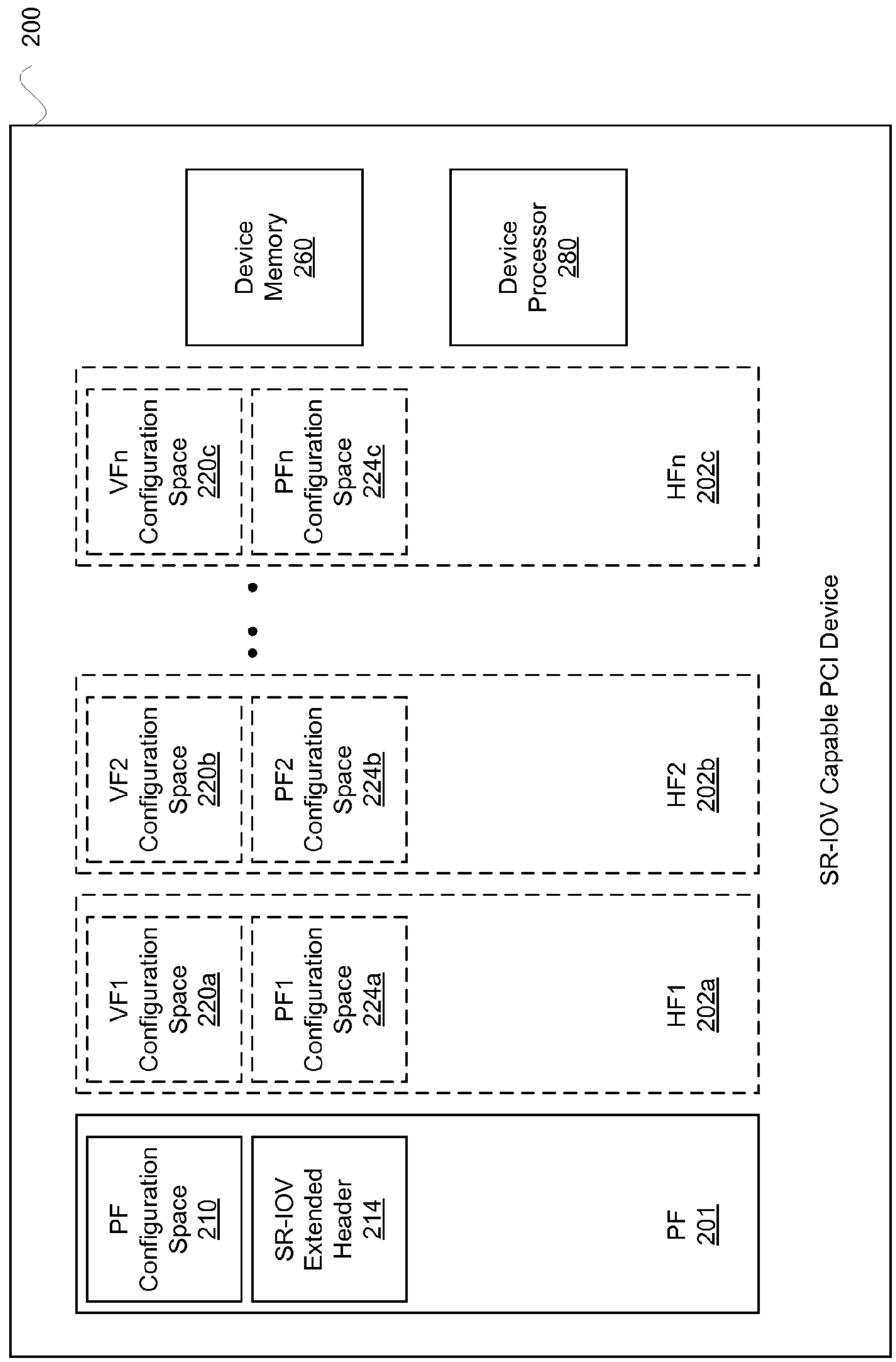
FIG. 2A is a block diagram illustrating an exemplary SR-IOV capable PCI device that is operable to provide hybrid function, in accordance with an embodiment of the invention.

FIG. 2A is a block diagram illustrating an exemplary SR-IOV capable PCI device that is operable to provide hybrid function, in accordance with an embodiment of the invention. Referring to FIG. 2A, there is shown a SR-IOV capable PCI device 200. The SR-IOV capable PCI device 200 may comprise a device memory 260, a device processor 280, a PF 201 and one or more HFs such as HF1 *202a*, HF2 *202b* and/or HFn *202c*. The PF 201 may comprise a PF configuration space 210 and a SR-IOV extended header 214. The HF1 *202a* may comprise a VF1 configuration space *220a* and a PF1 configuration space *224a*. The HF2 *202b* may comprise a VF2 configuration space *220b* and a PF2 configuration space *224b*. The HFn *202c* may comprise a VFn configuration space *220c* and a PFn configuration space *224c*.

The PF 201 may be programmed to expose the SR-IOV extended header 214 and/or the PF configuration space 210 to an associated PCI driver or hide the SR-IOV extended header 214 and/or the PF configuration space 210 from the PCI driver. Each HF such as the HF1 202*a*, the HF2 202*b* or the HFn 202*c* is a logical unit within the SR-IOV capable device 200 and may be configured as a VF or a PF prior to PCI device enumeration. Once the HF such as the HF1 202*a*, the HF2 202*b* or the HFn 202*c* is configured, the HF continues to operate in the configured mode until the occurrence of either a function level reset (FLR) or a device reset.

The device memory 260 may comprise suitable logic, circuitry, interfaces and/or code that may be operable to store information such as executable instructions and data that may be utilized by the device processor 280. The device memory 260 may comprise RAM, ROM and/or other suitable electronic data storage.

The device processor 280 may comprise suitable logic, circuitry, interfaces and/or code that may be operable to process data associated with the SR-IOV capable PCI device 200. The device processor 280 may be operable to manage and/or configure resources based on the SR-IOV standard with the PF 201 and the HFs such as the HF1 202*a*, the HF2 202*b* and the HFn 202*c*. The device processor 280 may operate in either SR-IOV environment or non-SR-IOV environment based on a configuration of the PF 201 and configurations of the HFs such as the HF1 202*a*, HF2 202*b* and the HFn 202*c*.

In instances when the SR-IOV capable PCI device 200 is operating in a SR-IOV environment, the device processor 280 may be operable to expose the PF configuration space 210 in the PF 201 to the associated PCI driver to provide a full-featured PCI function. The SR-IOV extended header 214 in the PF 201 may be exposed to the associated PCI driver for managing SR-IOV functionality. The VF1 configuration space 220*a*, the VF2 configuration space 220*b*, the VFn configuration space 220*c* in the HF1 202*a*, the HF2 202*b*, the HFn 202*c* respectively may be exposed to the associated PCI driver to configure HF1 202*a*, HF2 202*b* and HFn 202*c* as VFs. The PF1 configuration space 224*a*, the PF2 configuration space 224*b*, the PF3 configuration space 224*c* in the HF1 202*a*, the HF2 202*b*, the HFn 202*c* respectively may be hidden from the associated PCI driver. While operating in this VF mode, the exposed SR-IOV extended header 214 may notify the associated PCI driver in the host computer system 100 that the SR-IOV capable PCI device 200 is indeed SR-IOV capable.

In instances when the SR-IOV capable PCI device 200 is operating in a non-SR-IOV environment, the device processor 280 may be operable to, for example, expose the PF configuration space 210 to the associated PCI driver and hide the SR-IOV extended header 214 from the associated PCI driver in the PF 201. The PF1 configuration space 224*a*, the PF2 configuration space 224*b*, the PFn configuration space 224*c* in the HF1 202*a*, the HF2 202*b*, the HFn 202*c* respectively may be exposed to the associated PCI driver to configure the HF1 202*a*, the HF2 202*b* and the HFn 202*c* as PFs. The VF1 configuration space 220*a*, the VF2 configuration 220*b*, the VFn configuration space 220*c* in the HF1 202*a*, the HF2 202*b*, the HFn 202*c* respectively may be hidden from the associated PCI driver. While operating in this dependent PF mode, each HF such as the HF1 202*a*, the HF2 202*b* or the HFn 202*c* may be viewed by the associated PCI driver as a PF. One HF device driver may be used for all HFs such as the HF1 202*a*, the HF2 202*b* and the HFn 202*c*. HF device driver instances are subordinates and the PF device driver instance may perform the arbitration and/or supervision functions. The PF 201 may control or be in charge of resources for arbitration and/or supervision functions that are common to the HFs such as the HF1 202*a*, the HF2 202*b* and the HFn 202*c*.

In a non-SR-IOV environment where each PF operates independent of the other PFs, the device processor 280 may be operable to, for example, hide both the PF configuration space 210 and the SR-IOV extended header 214 in the PF 201 from the associated PCI driver. The PF1 configuration space 224*a*, the PF2 configuration space 224*b*, the PFn configuration space 224*c* in the HF1 202*a*, the HF2 202*b*, the HFn 202*c* respectively may be exposed to the associated PCI driver to configure the HF1 202*a*, the HF2 202*b* and the HFn 202*c* as independent PFs. The VF1 configuration space 220*a*, the VF2 configuration space 220*b*, the VFn configuration space 220*c* in the HF1 202*a*, the HF2 202*b*, the HFn 202*c* respectively may be hidden from the associated PCI driver. While operating in this independent PF mode, the associated PCI driver does not detect the PF 201. A different HF device driver may be used for each of the HFs such as the HF1 202*a*, the HF2 202*b* or the HFn 202*c*. In this regard, each of the HFs such as the HF1 202*a*, the HF2 202*b* or the HFn 202*c* configured as a PF may operate independently without affecting operations of the others. Each of the HFs such as the HF1 202*a*, the HF2 202*b* or the HFn 202*c* may be managed and supervised individually, when requested, via an internal routing to the hidden PF 201, for example.

In operation, the device processor 280 may be operable to manage and/or configure the resources based on the SR-IOV standard with the PF 201 and the HFs such as the HF1 202*a*, the HF2 202*b* and the HFn 202*c*. In instances when the SR-IOV capable PCI device 200 is operating in a SR-IOV environment, the device processor 280 may be operable to expose the PF configuration space 210 in the PF 201 to the associated PCI driver. The SR-IOV extended header 214 in the PF 201 may be exposed to the associated PCI driver. The VF1 configuration space 220*a*, the VF2 configuration space 220*b*, the VFn configuration space 220*c* in the HF1 202*a*, the HF2 202*b*, the HFn 202*c* respectively may be exposed to the associated PCI driver. The PF1 configuration space 224*a*, the PF2 configuration space 224*b*, the PF3 configuration space 224*c* in the HF1 202*a*, the HF2 202*b*, the HFn 202*c* respectively may be hidden from the associated PCI driver.

In instances when the SR-IOV capable PCI device 200 is operating in a non-SR-IOV environment, the device processor 280 may be operable to, for example, expose the PF configuration space 210 to the associated PCI driver and hide the SR-IOV extended header 214 from the associated PCI driver in the PF 201. The PF1 configuration space 224*a*, the PF2 configuration space 224*b*, the PFn configuration space 224*c* in the HF1 202*a*, the HF2 202*b*, the HFn 202*c* respectively may be exposed to the associated PCI driver. The VF1 configuration space 220*a*, the VF2 configuration 220*b*, the VFn configuration space 220*c* in the HF1 202*a*, the HF2 202*b*, the HFn 202*c* respectively may be hidden from the associated PCI driver. The PF 201 may control or be in charge of the resources for arbitration and/or supervision functions that are common to the HFs such as the HF1 202*a*, the HF2 202*b* and the HFn 202*c*.

In a non-SR-IOV environment where each PF operates independent of the other PFs, the device processor 280 may be operable to, for example, hide both the PF configuration space 210 and the SR-IOV extended header 214 in the PF 201 from the associated PCI driver. The PF1 configuration space 224*a*, the PF2 configuration space 224*b*, the PFn configuration space 224*c* in the HF1 202*a*, the HF2 202*b*, the HFn 202*c* respectively may be exposed to the associated PCI driver. The VF1 configuration space 220*a*, the VF2 configuration space

220*b*, the VFn configuration space 220*c* in the HF1 202*a*, the HF2 202*b*, the HFn 202*c* respectively may be hidden from the associated PCI driver. In this regard, each of the HFs such as the HF1 202*a*, the HF2 202*b* or the HFn 202*c* configured as a PF may operate independently without affecting operations of the others. Each of the HFs such as the HF1 202*a*, the HF2 202*b* or the HFn 202*c* may be managed and supervised individually, when requested, via an internal routing to the hidden PF 201, for example.

Figure 2B:
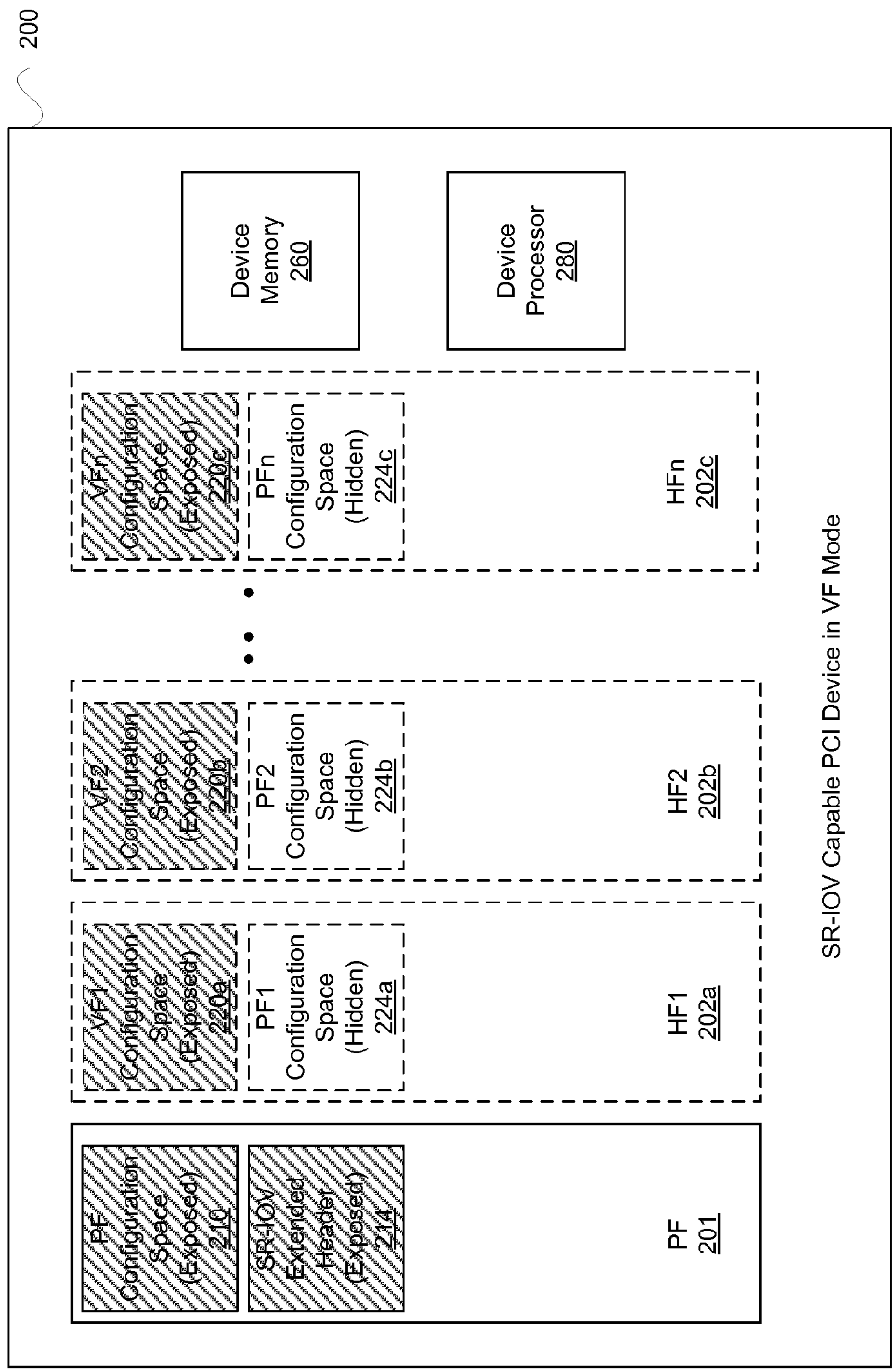
FIG. 2B is a block diagram illustrating an exemplary SR-IOV capable PCI device in VF mode, in accordance with an embodiment of the invention.

FIG. 2B is a block diagram illustrating an exemplary SR-IOV capable PCI device in VF mode, in accordance with an embodiment of the invention. Referring to FIG. 2B, there is shown the SR-IOV capable PCI device 200 that may comprise the device memory 260, the device processor 280, the PF 201 and one or more HFs such as the HF1 202*a*, the HF2 202*b* and/or the HFn 202*c* described above with respect to FIG. 2A.

In the VF mode, the SR-IOV capable PCI device 200 is operating in a SR-IOV environment. The device processor 280 may be operable to expose the PF configuration space 210 in the PF 201 to an associated PCI driver to provide a full-featured PCI function. The SR-IOV extended header 214 in the PF 201 may be exposed to the associated PCI driver for managing SR-IOV functionality. The VF1 configuration space 220*a*, the VF2 configuration space 220*b*, the VFn configuration space 220*c* in the HF1 202*a*, the HF2 202*b*, the HFn 202*c* respectively may be exposed to the associated PCI driver to configure HF1 202*a*, HF2 202*b* and HFn 202*c* as VFs. The PF1 configuration space 224*a*, the PF2 configuration space 224*b*, the PF3 configuration space 224*c* in the HF1 202*a*, the HF2 202*b*, the HFn 202*c* respectively may be hidden from the associated PCI driver. In this regard, the exposed SR-IOV extended header 214 may notify the associated PCI driver in the host computer system 100 that the SR-IOV capable PCI device 200 is indeed SR-IOV capable.

Figure 2C:
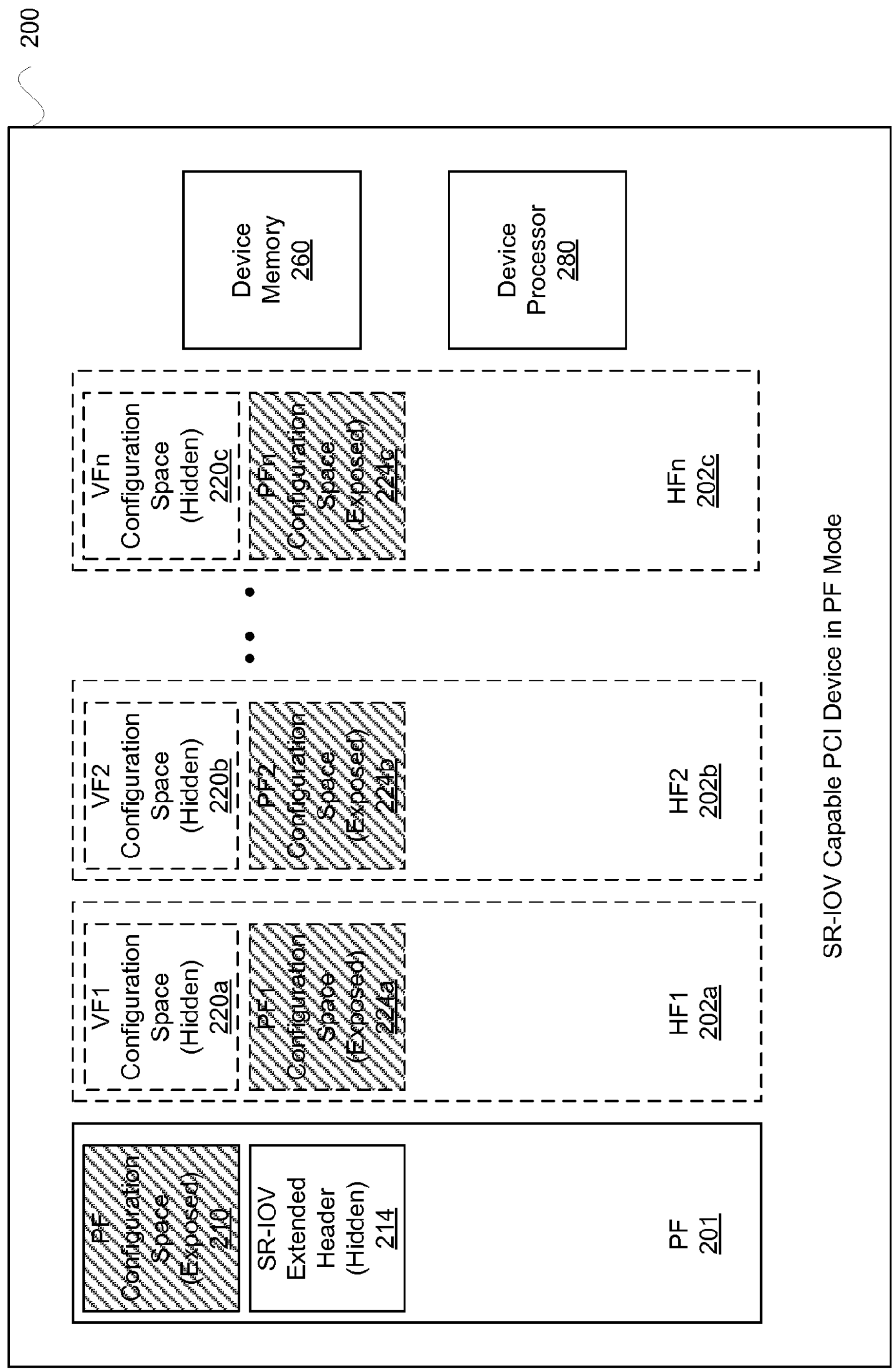
FIG. 2C is a block diagram illustrating an exemplary SR-IOV capable PCI device in dependent PF mode, in accordance with an embodiment of the invention.

FIG. 2C is a block diagram illustrating an exemplary SR-IOV capable PCI device in dependent PF mode, in accordance with an embodiment of the invention. Referring to FIG. 2C, there is shown the SR-IOV capable PCI device 200 that may comprise the device memory 260, the device processor 280, the PF 201 and one or more HFs such as the HF1 202*a*, the HF2 202*b* and/or the HFn 202*c* described above with respect to FIG. 2A.

In the dependent PF mode, the SR-IOV capable PCI device 200 is operating in a non-SR-IOV environment. The device processor 280 may be operable to, for example, expose the PF configuration space 210 in the PF 201 to an associated PCI driver and hide the SR-IOV extended header 214 in the PF 201 from the associated PCI driver. The PF1 configuration space 224*a*, the PF2 configuration space 224*b*, the PFn configuration space 224*c* in the HF1 202*a*, the HF2 202*b*, the HFn 202*c* respectively may be exposed to the associated PCI driver to configure the HF1 202*a*, the HF2 202*b* and the HFn 202*c* as PFs. The VF1 configuration space 220*a*, the VF2 configuration 220*b*, the VFn configuration space 220*c* in the HF1 202*a*, the HF2 202*b*, the HFn 202*c* respectively may be hidden from the associated PCI driver. In this regard, each HF such as the HF1 202*a*, the HF2 202*b* or the HFn 202*c* may be viewed by the associated PCI driver as a PF. One HF device driver may be used for all HFs such as the HF1 202*a*, the HF2 202*b* and the HFn 202*c*. HF device driver instances are subordinates and the PF device drive instance may perform the arbitration and/or supervision functions. The PF 201 may control or be in charge of resources for arbitration and/or supervision that are common to the HFs such as the HF1 202*a*, the HF2 202*b* and the HFn 202*c*.

Figure 2D:
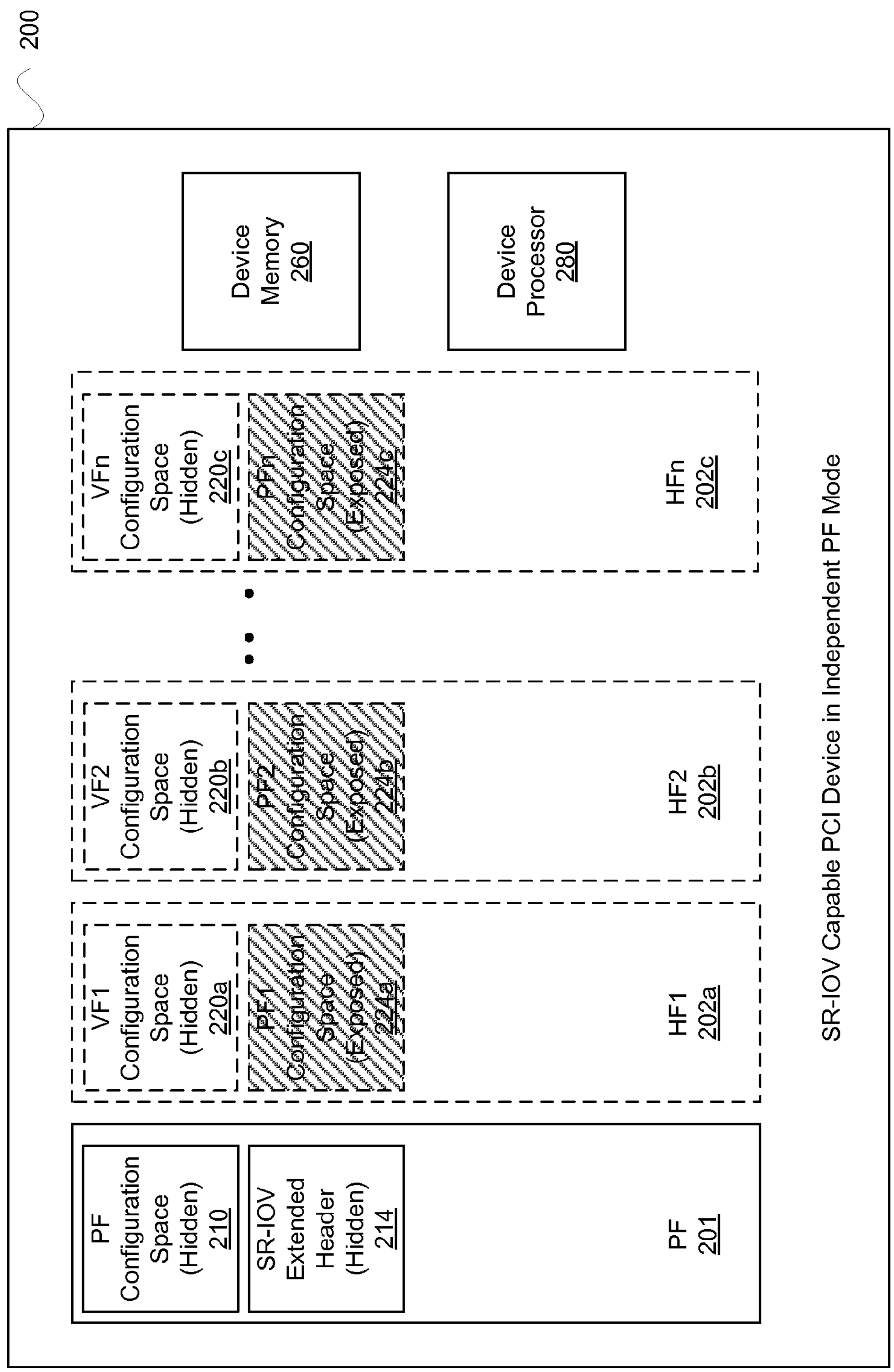
FIG. 2D is a block diagram illustrating an exemplary SR-IOV capable PCI device in independent PF mode, in accordance with an embodiment of the invention.

FIG. 2D is a block diagram illustrating an exemplary SR-IOV capable PCI device in independent PF mode, in accordance with an embodiment of the invention. Referring to FIG. 2D, there is shown the SR-IOV capable PCI device 200 that may comprise the device memory 260, the device processor 280, the PF 201 and one or more HFs such as the HF1 202*a*, the HF2 202*b* and/or the HFn 202*c* described above with respect to FIG. 2A.

In the independent PF mode, the SR-IOV capable PCI device 200 is operating in a non-SR-IOV environment where each PF operates independent of the other PFs. The device processor 280 may be operable to, for example, hide both the PF configuration space 210 and the SR-IOV extended header 214 in the PF 201 from an associated PCI driver. The PF1 configuration space 224*a*, the PF2 configuration space 224*b*, the PFn configuration space 224*c* in the HF1 202*a*, the HF2 202*b*, the HFn 202*c* respectively may be exposed to the associated PCI driver to configure the HF1 202*a*, the HF2 202*b* and the HFn 202*c* as independent PFs. The VF1 configuration space 220*a*, the VF2 configuration space 220*b*, the VFn configuration space 220*c* in the HF1 202*a*, the HF2 202*b*, the HFn 202*c* respectively may be hidden from the associated PCI driver. In this regard, the associated PCI driver does not detect the PF 201. A different HF device driver is used for each of the HFs such as the HF1 202*a*, the HF2 202*b* or the HFn 202*c*. Each of the HFs such as the HF1 202*a*, the HF2 202*b* or the HFn 202*c* configured as a PF may operate independently without affecting operations of the others. Each of the HFs such as the HF1 202*a*, the HF2 202*b* or the HFn 202*c* may be managed and supervised individually, when requested, via an internal routing to the hidden PF 201, for example.

Figure 3:
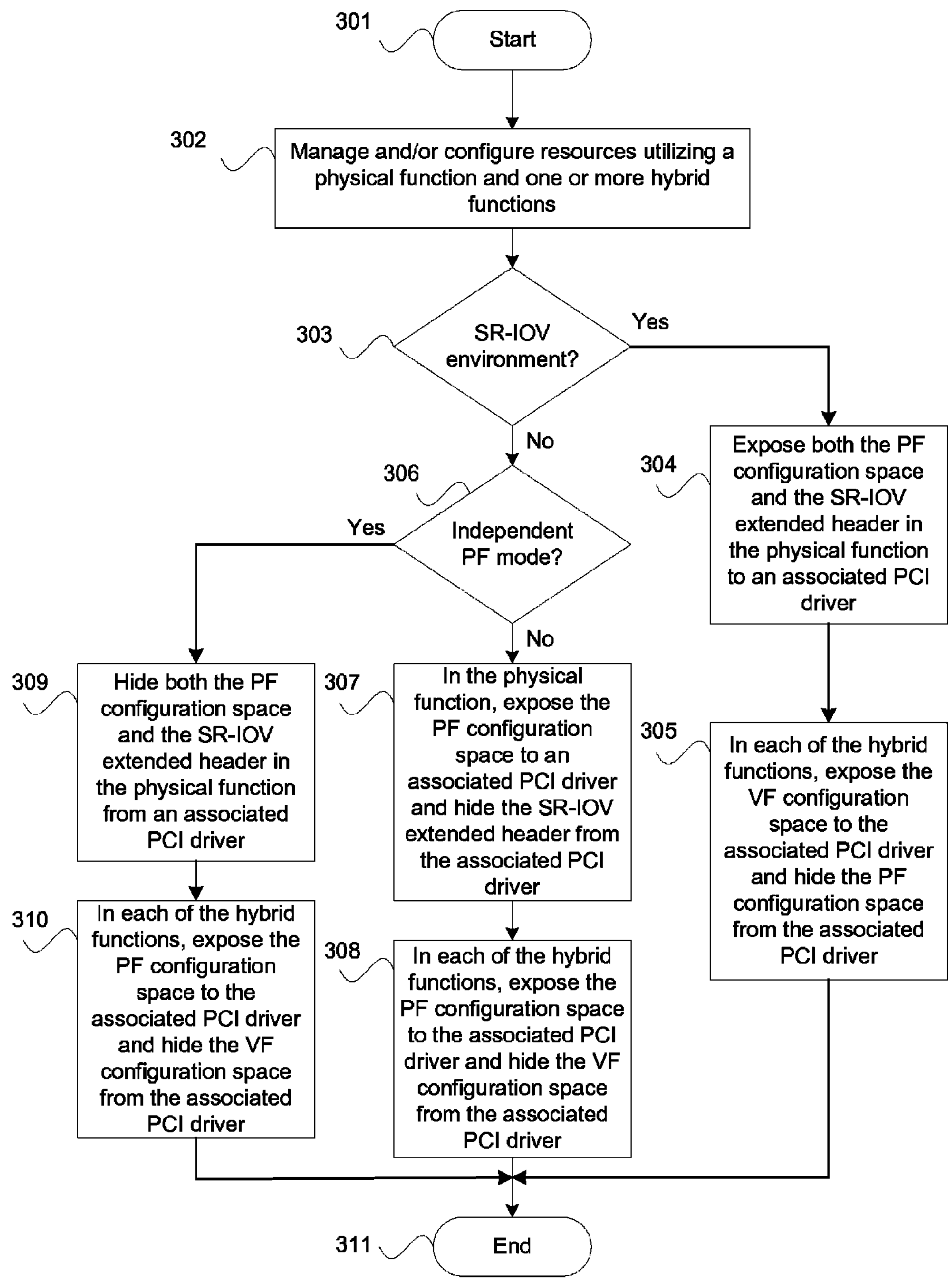
FIG. 3 is a flow chart illustrating exemplary steps for PCI hybrid function, in accordance with an embodiment of the invention.

FIG. 3 is a flow chart illustrating exemplary steps for PCI hybrid function, in accordance with an embodiment of the invention. Referring to FIG. 3, the exemplary steps start at step 301. In step 302, the SR-IOV capable PCI device 102 is operable to manage and/or configure resources utilizing a physical function and one or more hybrid functions. In step 303, it is determined whether operating in SR-IOV environment is occurring. In instances when the SR-IOV capable PCI device 102 is operating in a SR-IOV environment, the exemplary steps may proceed to step 304. In step 304, the SR-IOV capable PCI device 102 may be operable to expose both the PF configuration space and the SR-IOV extended header in the physical function to an associated PCI driver.

In step 305, the SR-IOV capable PCI device 102 may be operable to, in each of the hybrid functions, expose the VF configuration space to the associated PCI driver and hide the PF configuration space from the associated PCI driver. The exemplary steps may proceed to the end step 311. In step 303, in instances when the SR-IOV capable PCI device 102 is operating in a non-SR-IOV environment, the exemplary steps may proceed to step 306. In step 306, it is determined whether or not operation is occurring in the independent PF mode. In instances when the SR-IOV capable PCI device 102 is not operating in an independent PF mode, the exemplary steps may proceed to step 307. In step 307, the SR-IOV capable PCI device 102 may be operable to, in the physical function, expose the PF configuration space to an associated PCI driver and hide the SR-IOV extended header from the associated PCI driver.

In step 308, the SR-IOV capable PCI device 102 may be operable to, in each of the hybrid functions, expose the PF configuration space to the associated PCI driver and hide the VF configuration space from the associated PCI driver. The exemplary steps may proceed to the end step 311. In step 306, in instances when the SR-IOV capable PCI device 102 is operating in an independent PF mode, the exemplary steps may proceed to step 309. In step 309, the SR-IOV capable PCI device 102 may be operable to hide both the PF configuration space and the SR-IOV extended header in the physical function from an associated PCI driver. In step 310, the SR-IOV capable PCI device 102 may be operable to, in each of the hybrid functions, expose the PF configuration space to the associated PCI driver and hide the VF configuration space from the associated PCI driver. The exemplary steps may proceed to the end step 311.

In various embodiments of the invention, a SR-IOV capable PCI device 200 may be operable to configure resources of the SR-IOV capable PCI device 200 to transparently operate in a non-SR-IOV environment utilizing a physical function (PF) 201 and one or more hybrid functions (HFs) 202*a*, 202*b*, 202*c*. In this regard, the physical function (PF) 201 and the hybrid functions (HFs) 202*a*, 202*b*, 202*c* are also utilized to configure the resources of the SR-IOV capable PCI device 200 to operate in a SR-IOV environment. The physical function 201 may comprise a PF configuration space 210 and a SR-IOV extended header 214, and the hybrid function 202*a* may comprise a VF configuration space 220*a* and a PF configuration space 224*a*. In instances when the SR-IOV capable PCI device 200 is operating in a SR-IOV environment, the SR-IOV capable PCI device 200 may configure the resources to operate in the SR-IOV environment by configuring the PF configuration space 210 and the SR-IOV extended header 214 in the physical function 201 and the VF configuration spaces 220*a*, 220*b*, 220*c* and the PF configuration spaces 224*a*, 224*b*, 224*c* in the hybrid functions 202*a*, 202*b*, 202*c* respectively. In this regard, the PF configuration space 210 in the physical function 201 may be exposed to an associated PCI driver to provide a full-featured PCI function. The SR-IOV extended header 214 in the physical function 201 may be exposed to the associated PCI driver for managing the SR-IOV functionality. The VF configuration spaces 220*a*, 220*b*, 220*c* in the hybrid functions 202*a*, 202*b*, 202*c* respectively may be exposed to the associated PCI driver. The PF configuration spaces 224*a*, 224*b*, 224*c* in the hybrid functions 202*a*, 202*b*, 202*c* respectively may be hidden from the associated PCI driver.

In instances when the SR-IOV capable PCI device 200 is operating in a non-SR-IOV environment, the SR-IOV capable PCI device 200 may also configure the resources to operate in the non-SR-IOV environment by configuring the PF configuration space 210 and the SR-IOV extended header 214 in the physical function 201 and the VF configuration spaces 220*a*, 220*b*, 220*c* and the PF configuration spaces 224*a*, 224*b*, 224*c* in the hybrid functions 202*a*, 202*b*, 202*c* respectively. In this regard, for example, the PF configuration space 210 in the physical function 201 may be exposed to an associated PCI driver. The SR-IOV extended header 214 in the physical function 201 may be hidden from the associated PCI driver. The PF configuration spaces 224*a*, 224*b*, 224*c* in the hybrid functions 202*a*, 202*b*, 202*c* respectively may be exposed to the associated PCI driver. The VF configuration spaces 220*a*, 220*b*, 220*c* in the hybrid functions 202*a*, 202*b*, 202*c* respectively may be hidden from the associated PCI driver. In this instance, the physical function 201 may control the resources for arbitration and/or supervision functions that are common to the hybrid functions 202*a*, 202*b*, 202*c*.

While operating in the non-SR-IOV environment, the SR-IOV capable PCI device 200 may also be operable to, for example, hide both the PF configuration space 210 and the SR-IOV extended header 214 in the physical function 201 from the associated PCI driver. The PF configuration spaces 224*a*, 224*b*, 224*c* in the hybrid functions 202*a*, 202*b*, 202*c* respectively may be exposed to the associated PCI driver. The VF configuration spaces 220*a*, 220*b*, 220*c* in the hybrid functions 202*a*, 202*b*, 202*c* respectively may be hidden from the associated PCI driver. In this instance, each of the hybrid functions 202*a*, 202*b*, 202*c* with PF configuration space exposed may operate independently without affecting operations of the others. Each of the hybrid functions 202*a*, 202*b*, 202*c* may be managed and supervised individually, when requested, via an internal routing to the hidden physical function 201, for example.

The SR-IOV capable PCI device 102 in the host computer system 100 may comprise, for example, a SR-IOV capable conventional PCI device, a SR-IOV capable PCI-X device, and/or a SR-IOV capable PCI express (PCI-E) endpoint device.

Another embodiment of the invention may provide a machine and/or computer readable storage and/or medium, having stored thereon, a machine code and/or a computer program having at least one code section executable by a machine and/or a computer, thereby causing the machine and/or computer to perform the steps as described herein for PCI hybrid function.

Accordingly, the present invention may be realized in hardware, software, or a combination of hardware and software. The present invention may be realized in a centralized fashion in at least one computer system or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for communication, the method comprising:

performing by one or more processors, one or more circuits, or any combination thereof in a single root I/O virtualization (SR-IOV) capable peripheral component interconnect (PCI) device:

configuring resources of said SR-IOV capable PCI device to transparently operate in a non-SR-IOV environment utilizing a physical function (PF) and one or more hybrid functions (HFs), wherein said physical function (PF) and said one or more hybrid functions (HFs) are also utilized to configure said resources of said SR-IOV capable PCI device to operate in a SR-IOV environment, wherein said physical function comprises a PF configuration space and a SR-IOV extended header.

2. The method according to claim 1, wherein said hybrid function comprises a virtual function (VF) configuration space and a PF configuration space.

3. The method according to claim 2, comprising configuring said resources of said SR-IOV capable PCI device to operate in said SR-IOV environment utilizing said PF configuration space and said SR-IOV extended header in said physical function and said VF configuration space and said PF configuration space in said hybrid function.

4. The method according to claim 3, wherein when said SR-IOV capable PCI device is operating in said SR-IOV environment:

said PF configuration space in said physical function is exposed to an associated PCI driver to provide a full-featured PCI function;

said SR-IOV extended header in said physical function is exposed to said associated PCI driver for managing SR-IOV functionality;

said VF configuration space in each of said one or more hybrid functions is exposed to said associated PCI driver; and said PF configuration space in each of said one or more hybrid functions is hidden from said associated PCI driver.

5. The method according to claim 2, comprising configuring said resources of said SR-IOV capable PCI device to operate in said non-SR-IOV environment utilizing said PF configuration space and said SR-IOV extended header in said physical function and said VF configuration space and said PF configuration space in said hybrid function.

6. The method according to claim 5, wherein when said SR-IOV capable PCI device is operating in said non-SR-IOV environment:

said PF configuration space in said physical function is exposed to an associated PCI driver;

said SR-IOV extended header in said physical function is hidden from said associated PCI driver;

said PF configuration space in each of said one or more hybrid functions is exposed to said associated PCI driver; and said VF configuration space in each of said one or more hybrid functions is hidden from said associated PCI driver.

7. The method according to claim 6, wherein said physical function controls said resources for arbitration or supervision functions that are common to said one or more hybrid functions.

8. The method according to claim 5, wherein when said SR-IOV capable PCI device is operating in said non-SR-IOV environment:

said PF configuration space in said physical function is hidden from an associated PCI driver;

said SR-IOV extended header in said physical function is hidden from said associated PCI driver;

said PF configuration space in each of said one or more hybrid functions is exposed to said associated PCI driver; and said VF configuration space in each of said one or more hybrid functions is hidden from said associated PCI driver.

9. The method according to claim 8, wherein:

each of said one or more hybrid functions operates independently without affecting operations of others; and each of said one or more hybrid functions is managed and supervised individually when requested via an internal routing to said hidden physical function.

10. The method according to claim 1, wherein said SR-IOV capable PCI device is selected from a group consisting of a SR-IOV capable conventional PCI device, a SR-IOV capable PCI-X device, and a SR-IOV capable PCI express (PCI-E) endpoint device.

11. A system for communication, the system comprising:

one or more processors, one or more circuits, or any combination thereof for use in a single root I/O virtualization (SR-IOV) capable peripheral component interconnect (PCI) device, wherein said one or more processors, one or more circuits, or any combination thereof are operable to:

configure resources of said SR-IOV capable PCI device to transparently operate in a non-SR-IOV environment utilizing a physical function (PF) and one or more hybrid functions (HFs), wherein said physical function (PF) and said one or more hybrid functions (HFs) are also utilized to configure said resources of said SR-IOV capable PCI device to operate in a SR-IOV environment, wherein said hybrid function comprises a virtual function (VF) configuration space and a PF configuration space.

12. The system according to claim 11, wherein said physical function comprises a PF configuration space and a SR-IOV extended header.

13. The system according to claim 12 wherein said one or more processors, one or more circuits, or any combination thereof are operable to configure said resources of said SR-IOV capable PCI device to operate in said SR-IOV environment utilizing said PF configuration space and said SR-IOV extended header in said physical function and said VF configuration space and said PF configuration space in said hybrid function.

14. The system according to claim 13, wherein when said SR-IOV capable PCI device is operating in said SR-IOV environment:

said PF configuration space in said physical function is exposed to an associated PCI driver to provide a full-featured PCI function;

said SR-IOV extended header in said physical function is exposed to said associated PCI driver for managing SR-IOV functionality;

said VF configuration space in each of said one or more hybrid functions is exposed to said associated PCI driver; and said PF configuration space in each of said one or more hybrid functions is hidden from said associated PCI driver.

15. The system according to claim 12, wherein said one or more processors, one or more circuits, or any combination thereof are operable to configure said resources of said SR-IOV capable PCI device to operate in said non-SR-IOV environment utilizing said PF configuration space and said SR-IOV extended header in said physical function and said VF configuration space and said PF configuration space in said hybrid function.

16. The system according to claim 15, wherein when said SR-IOV capable PCI device is operating in said non-SR-IOV environment:

said PF configuration space in said physical function is exposed to an associated PCI driver;

said SR-IOV extended header in said physical function is hidden from said associated PCI driver;

said PF configuration space in each of said one or more hybrid functions is exposed to said associated PCI driver; and said VF configuration space in each of said one or more hybrid functions is hidden from said associated PCI driver.

17. The system according to claim 16, wherein said physical function controls said resources for arbitration or supervision functions that are common to said one or more hybrid functions.

18. The system according to claim 15, wherein when said SR-IOV capable PCI device is operating in said non-SR-IOV environment:

said PF configuration space in said physical function is hidden from an associated PCI driver;

said SR-IOV extended header in said physical function is hidden from said associated PCI driver;

said PF configuration space in each of said one or more hybrid functions is exposed to said associated PCI driver; and said VF configuration space in each of said one or more hybrid functions is hidden from said associated PCI driver.

19. The system according to claim 18, wherein:

each of said one or more hybrid functions operates independently without affecting operations of others; and each of said one or more hybrid functions is managed and supervised individually when requested via an internal routing to said hidden physical function.

20. The system according to claim 11, wherein said SR-IOV capable PCI device is selected from a group consisting of a SR-IOV capable conventional PCI device, a SR-IOV capable PCI-X device, and a SR-IOV capable PCI express (PCI-E) endpoint device.

21. A system for communication, the system comprising:

a means for performing by one or more processors, one or more circuits, or any combination thereof in a single root I/O virtualization (SR-IOV) capable peripheral component interconnect (PCI) device:

a means for configuring resources of said SR-IOV capable PCI device to transparently operate in a non-SR-IOV environment utilizing a physical function (PF) and one or more hybrid functions (HFs), wherein said physical function (PF) and said one or more hybrid functions (HFs) are also utilized to configure said resources of said SR-IOV capable PCI device to operate in a SR-IOV environment, wherein said physical function comprises a PF configuration space and a SR-IOV extended header, and wherein said hybrid function comprises a virtual function (VF) configuration space and a PF configuration space.

* * * * *